(12) United States Patent
Urita

(10) Patent No.: US 6,466,777 B1
(45) Date of Patent: Oct. 15, 2002

(54) CLONE TERMINAL DETECTION SYSTEM AND METHOD

(75) Inventor: Hiroyuki Urita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/459,930

(22) Filed: Dec. 14, 1999

(30) Foreign Application Priority Data

Dec. 15, 1998 (JP) .......................................... 10-356250

(51) Int. Cl.[7] .................................................. H04M 1/66
(52) U.S. Cl. ........................ 455/410; 455/411; 455/456
(58) Field of Search .................................. 455/410, 411, 455/456, 403, 580, 414, 432, 435, 433, 551, 552; 340/825.3, 825.34, 825.49; 379/188, 196, 197, 189, 114, 115; 380/23, 20

(56) References Cited

U.S. PATENT DOCUMENTS

| 5,309,501 A | | 5/1994 | Kozik et al. ................... 379/58 |
| 5,953,653 A | * | 9/1999 | Josenhans et al. ........... 455/410 |
| 5,970,404 A | * | 10/1999 | Foti ............................ 455/410 |
| 6,097,938 A | * | 8/2000 | Paxson ....................... 455/410 |
| 6,161,006 A | * | 12/2000 | Balachandran .............. 455/410 |
| 6,185,416 B1 | * | 2/2001 | Rudokas et al. ............. 455/410 |

FOREIGN PATENT DOCUMENTS

| EP | 714219 A2 | * 11/1995 | ............ H04Q/7/38 |
| JP | 63-155922 | 6/1988 | |
| JP | 6-69879 | 3/1994 | |
| JP | 7-46661 | 2/1995 | |
| JP | 10-191457 | 7/1998 | |

* cited by examiner

Primary Examiner—Daniel Hunter
Assistant Examiner—Pablo N Tran
(74) Attorney, Agent, or Firm—Foley & Lardner

(57) ABSTRACT

A clone terminal detection system includes a position information memory, comparator, and detector. The position information memory updates and stores position registration information of a mobile terminal, which includes a telephone number, on the basis of a position registration request from one of the mobile terminal and a clone terminal illegally copied from the mobile terminal. The comparator compares position registration information of an origination request terminal with the position registration information stored in the position information memory at the time of origination request from one of the mobile and clone terminals. The detector detects the presence of the clone terminal having the same telephone number as that of the mobile terminal on the basis of the comparison result from the comparator. A clone terminal detection method is also disclosed.

10 Claims, 6 Drawing Sheets

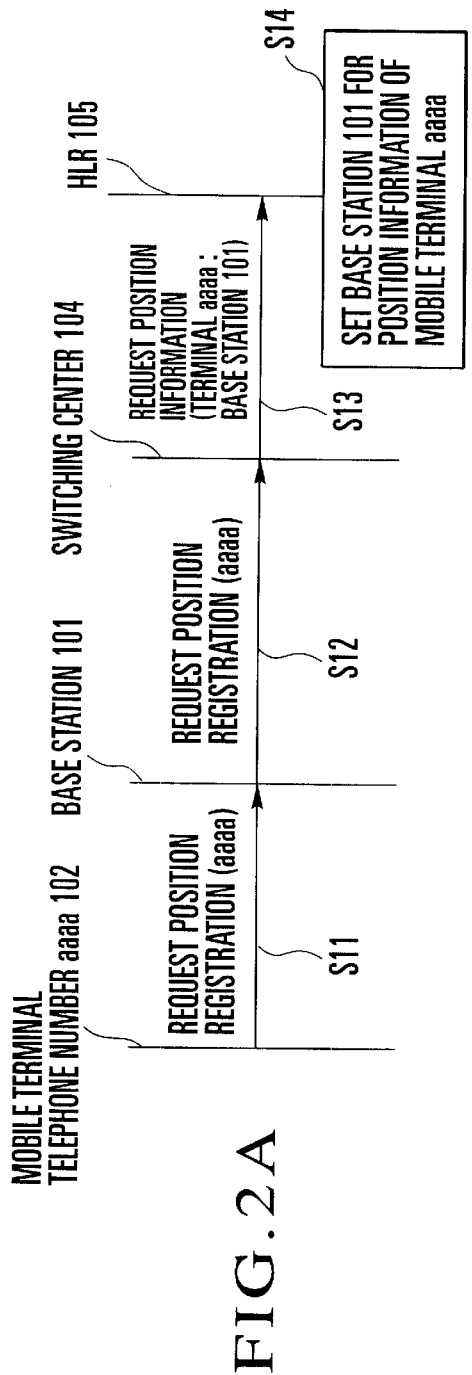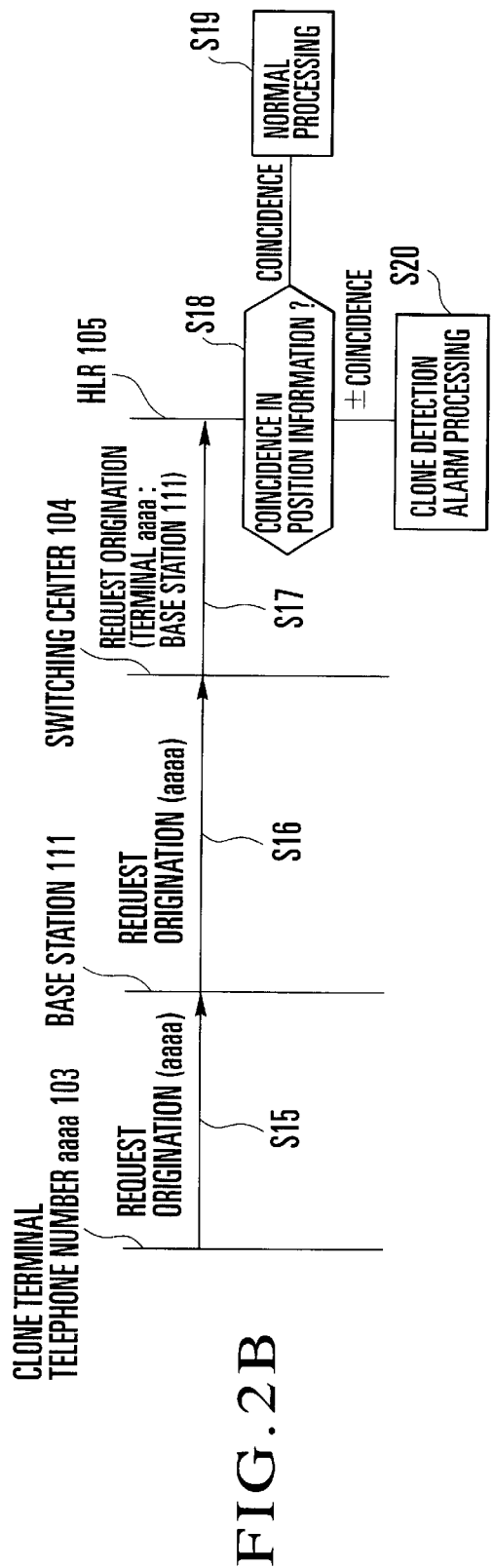

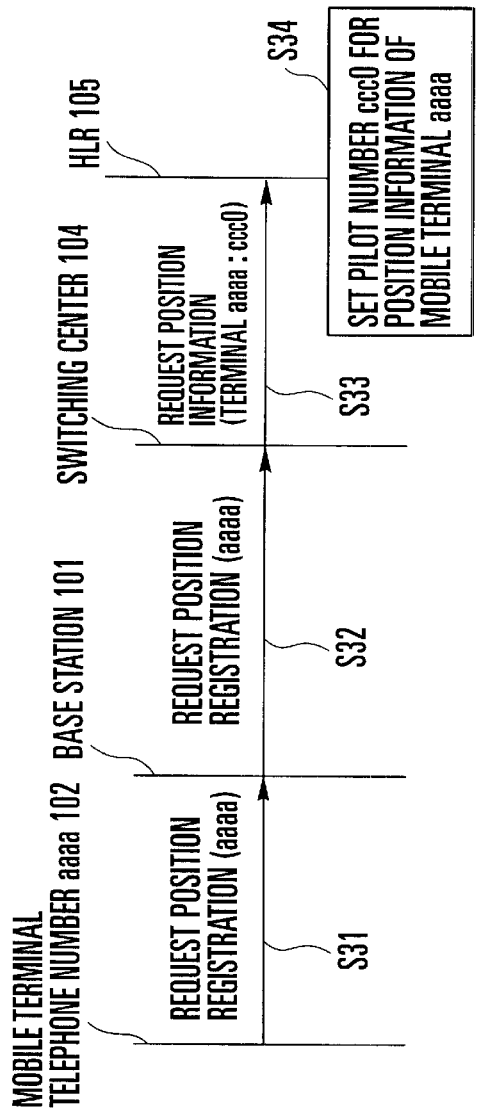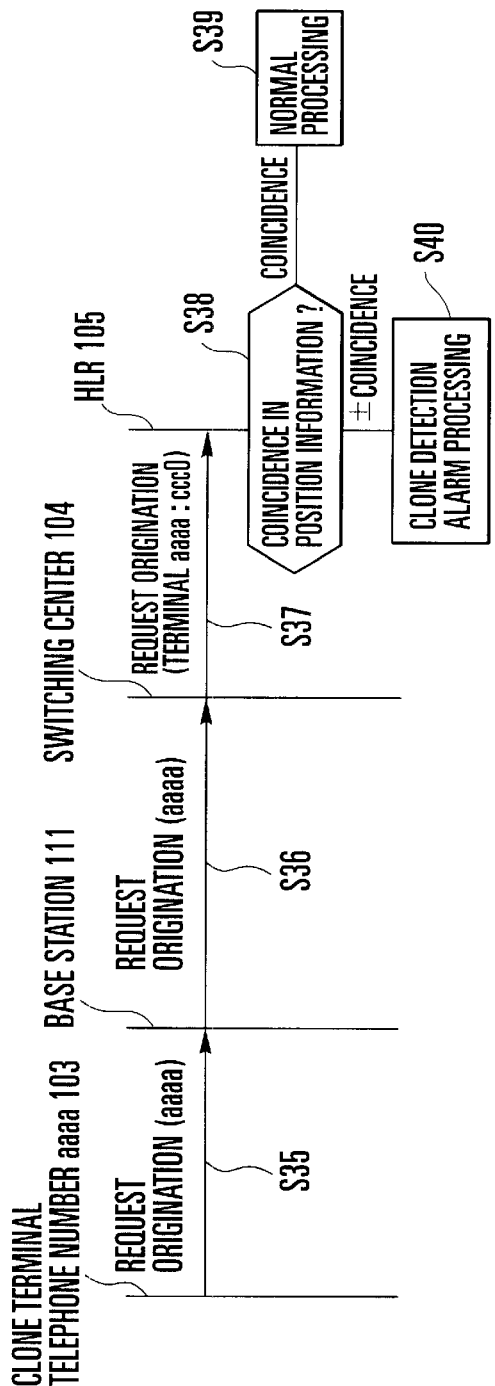
FIG. 5A
FIG. 5B

CLONE TERMINAL DETECTION SYSTEM AND METHOD

BACKGROUND OF THE INVENTION

The present invention relates to a clone terminal detection system and method for detecting the presence of a clone mobile station illegally copied from an authentic mobile station.

The presence of clone terminals (clone mobile stations) illegally copied in mobile communication systems such as portable telephones has recently been an important problem. A user having a clone terminal can perform illegal communications free of charge. The fees of the illegal communications are charged to the user having the authentic mobile terminal.

A conventional clone terminal detection method is performed as follows. Key information is stored in both a switching center (or base station) and a mobile terminal. The key information stored in the switching center or base station is compared with that stored in the mobile terminal to detect the presence of a clone terminal. FIGS. 6A and 6B explain a conventional clone terminal detection system described in Japanese Patent Laid-Open No. 10-191457 (reference 1).

As shown in FIG. 6B, a conventional clone terminal detection system comprises a base station 1 having a memory 1a comprised of a nonvolatile memory for storing communication logs and a mobile station 2 having a memory 2a comprised of a nonvolatile memory for storing communication logs.

The operation of the conventional clone terminal detection system having the above arrangement will be described below. Previous communication logs A of communications between the base station 1 and mobile station 2 are stored in the memories 1a and 2a. When the base station 1 communicates with the mobile station 2 (step S1), a communication log B unique to this communication is stored in the memories 1a and 2b of the base and mobile stations 1 and 2. The communication between the base and mobile stations 1 and 2 means a case in which the mobile station 2 communicates with the base station 1 for position registration as soon as the mobile station 1 enters into the communication area of the base station 1, or a case in which the mobile station 2 performs speech communication with the base station 1. An example of the communication log is the date of communication.

A clone mobile station 3 is copied from the mobile station 2 (step S2). At this time, the communication logs A and B stored in the memory 2a of the mobile station 2 are perfectly copied to a memory 3a of the clone mobile station 3. When the clone mobile station 3 communicates with the base station 1 (step S3), a communication log C is stored in the memories 1a and 3a, as shown in FIG. 6B. When the mobile station 2 then communicates with the base station 1 (step S4), a communication log D is stored in the memories 1a and 2a, as shown in FIG. 6B. The memory 1a of the base station 1 stores the communication logs A, B, C, and D, while the memory 2a of the mobile station 2 stores the communication logs A, B, and D.

In the clone terminal detection system, the communication logs stored in the memories 1a and 2a of the base and mobile stations 1 and 2 are compared with each other at a predetermined timing, e.g., every predetermined interval or at the start or end of communication. If the illegal clone mobile terminal 3 is present, the communication logs in the authentic mobile station 2 do not match those of the base station, thereby detecting the presence of the clone mobile station 3.

The conventional technique described above, however, suffers the following problems.

As the first problem, a clone terminal detection function is required in each of the base and mobile stations 1 and 2. That is, the memories 1a and 2a for storing the communication longs are required in the base and mobile stations 1 and 2, respectively.

As the second problem, a special interface is required in a radio zone. That is, the base station 1 must be notified of the communication longs of the mobile station 2 for comparison between the communication logs.

SUMMARY OF THE INVENTION

It is an object of the present invention to provide a clone terminal detection system and method capable of detecting the presence of a clone terminal without causing a mobile terminal to have a special function of detecting a clone terminal.

In order to achieve the above object of the present invention, there is provided a clone terminal detection system comprising first storage means for updating and storing position registration information of a mobile terminal, which includes a telephone number, on the basis of a position registration request from one of the mobile terminal and a clone terminal illegally copied from the mobile terminal, comparison means for comparing position registration information of an origination request terminal with the position registration information stored in the first storage means at the time of origination request from one of the mobile and clone terminals, and detection means for detecting the presence of the clone terminal having the same telephone number as that of the mobile terminal on the basis of a comparison result from the comparison means.

BRIEF DESCRIPTION OF THE DRAWINGS

FIGS. 2A and 2B are sequence charts for explaining the operation of a clone terminal detection operation in the mobile communication system in FIG. 1;

FIGS. 5A and 5B are sequence charts for explaining a clone terminal detection operation in the mobile communication system in FIG. 3.

DESCRIPTION OF THE PREFERRED EMBODIMENTS

The present invention will be described below in detail with reference to the accompanying drawings.

First Embodiment

Figure 1:
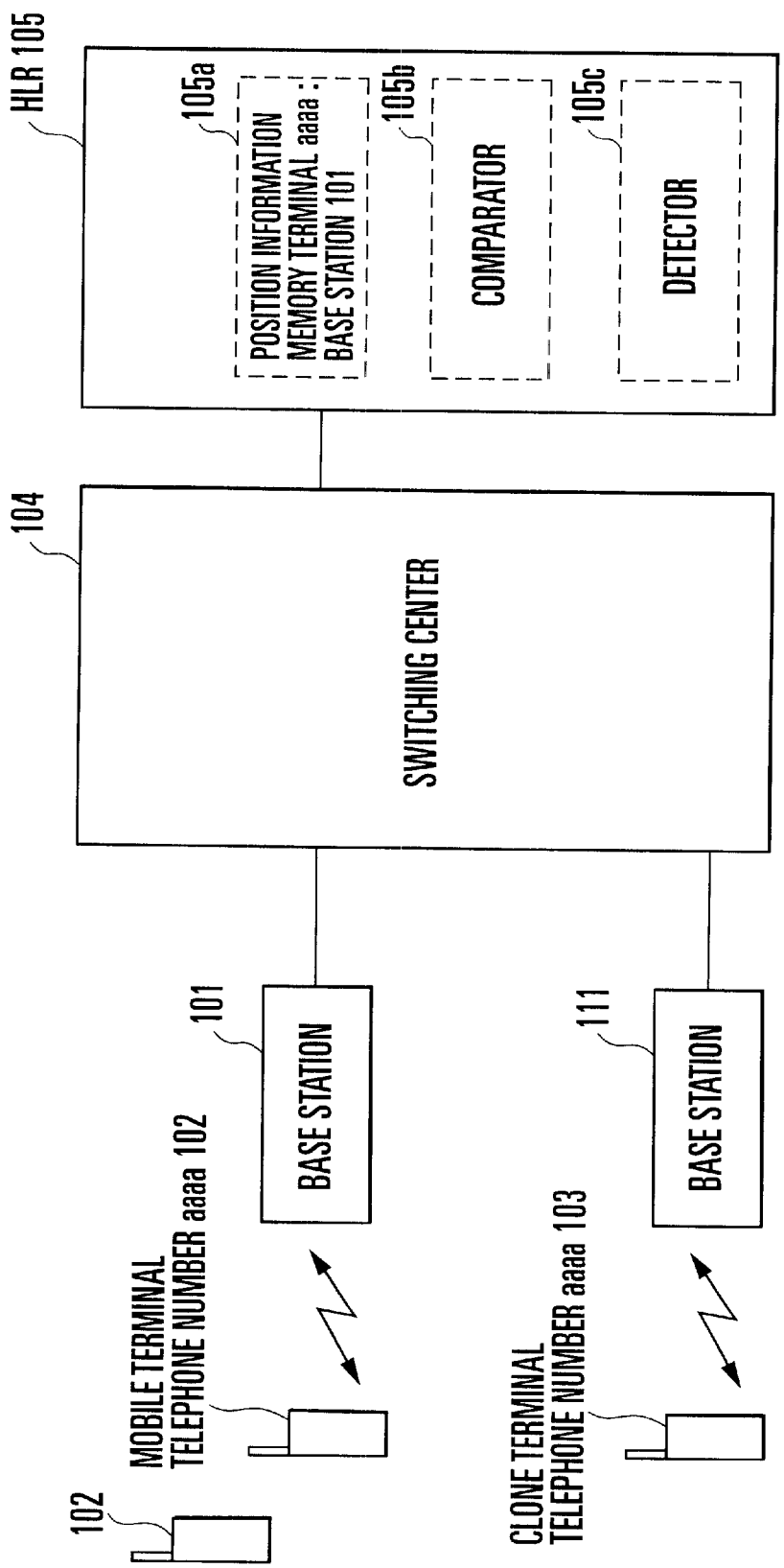
FIG. 1 a block diagram showing the system configuration of a mobile communication system according to the first embodiment of the present invention.

FIG. 1 shows a mobile communication system according to the first embodiment of the present invention. The mobile communication system has a mobile communication device such as a portable telephone or vehicle-mounted terminal as a target and has a clone terminal detection system for detecting the presence of a clone terminal as an illegally copied mobile communication device.

This clone terminal detection system is based on the concept that a given mobile terminal cannot exist under the control of a plurality of base stations. In the clone terminal detection system, when a plurality of mobile terminals having the same telephone number in processing called position registration for notifying the system of the position of a mobile terminal for termination processing to the mobile terminal (in other words, when a clone terminal is present), only the last position-registered base station information (position registration information) is left regardless of the authentic mobile terminal or clone terminal. The present invention is based on this fact. According to the characteristic feature of the present invention, the position registration information sent by another mobile terminal under the control of another base station is compared with the sent base station information to detect the presence of a clone terminal.

The mobile communication system shown in FIG. 1 includes a plurality of mobile terminals 102 including a mobile terminal having a telephone number "aaaa", a clone terminal 103 which is illegally copied from the mobile terminal 102 having the telephone number "aaaa" and has the same telephone number "aaaa", base stations 101 and 111 for communicating with the mobile terminal 102 and clone terminal 103, a switching center 104 connected to the base stations 101 and 111, and an HLR (Home Location Register) 105 connected to the switching center 104.

The base stations 101 and 111 exchange information of the mobile station 101 with the switching center 104 via a radio interface. The switching center 104 performs switching between mobile communication channels. The HLR 105 comprises a position information memory 105a for storing the current position of the mobile terminal 102 as position registration information, a comparator 105b for comparing the position registration information stored in the position information memory 105a with the received position registration information, and a detector 105c for detecting the presence of the clone terminal 103 on the basis of the comparison result of the comparator 105b. The HLR 105 also stores subscriber data of the mobile terminal 102.

The position information memory 105a serves as a database for storing data representing the correspondence between the mobile terminal 102 and one of the base stations 101 and 111 which currently controls the mobile terminal 102, using the telephone number of the mobile terminal 102 as a search key. Every time the mobile terminal 102 moves, position registration request processing is performed from the mobile terminal 102 to the HLR 105. The position registration information stored in the position information memory 105a in the HLR 105 is updated.

The operation of the clone terminal detection system having the above arrangement will be described with reference to FIGS. 2A and 2B.

Referring to FIG. 2A, when the mobile terminal 102 having the telephone number "aaaa" requests position registration for the base station 101, data (terminal aaaa: base station 101) representing that the mobile terminal 102 having the telephone number "aaaa" and having made last position registration is present under the control of the base station 101 is stored in the position information memory 105a of the HLR 105. Note that the position registration request of the mobile terminal 102 for the base station 101 is known as described in reference 1.

As shown in FIG. 2B, when the clone terminal 103 having the telephone number "aaaa" makes an origination request under the control of the base station 111, the switching center 104 sends position registration information (aaaa: base station 111) corresponding to the origination request from the clone terminal 103. The comparator 105b in the HLR 105 compares the position registration information (aaaa: base station 101) stored in the position information memory 105a with the position registration information (aaaa: base station 111) received from the switching center 104. The comparator 105b determines an unconincidence in position registration. As a result, the presence of the clone terminal 103 can be detected.

The operation of the clone terminal detection system described above will be described in more detail using the step numbers.

First, position registration request processing of the mobile terminal 102 having the telephone number "aaaa" will be described with reference to FIG. 2A. When the mobile terminal 102 becomes under the control of the base station 101 (enters the area of the base station 101), the mobile terminal 102 requests position registration with the telephone number "aaaa" (step S11). The switching center 104 is notified of this position registration request via the base station 101 (step S12). The position registration request is converted by the switching center 104 into information representing that the mobile terminal 102 having the telephone number "aaaa" is under the control of the base station 101. The switching center 104 sends this information to the HLR 105 (step S13). The HLR 105 registers the base station 101 as the position registration information of the mobile terminal 102 having the telephone number "aaaa" in the position information memory 105a (step S14).

Origination request processing of the clone terminal 103 having the telephone number "aaaa" will be described with reference to FIG. 2B. When the clone terminal 103 illegally copied from the mobile terminal 102 and having the telephone number "aaaa" sends an origination request with the telephone number "aaaa" under the control of the base station 111 (step S15), the switching center 104 is notified of this origination request via the base station 111 (step S16). The switching center 104 adds the information of the base station 111 to the origination request from the clone terminal 103 having the telephone number "aaaa" and sends the resultant information to the HLR 105 (step S17). At this time, the comparator 105b in the HLR 105 compares the position registration storage information with the received position registration information (step S18). If the comparator 105b detects a coincidence, normal origination processing is performed (step S19).

In FIG. 2B, however, the position registration information stored in the position information memory 105a represents that the mobile terminal 102 is under the control of the base station 101. The detector 105c determines on the basis of the comparison result of the comparator 105b that the origination request under the control of the base station 111 is invalid, thereby detecting the presence of the clone terminal 103. The HLR 105 performs clone detection alarm processing due the noncoincidence in position registration information. The user of the mobile terminal 102 having the telephone number "aaaa" is notified of the presence of the clone terminal 103 (step S20).

The noncoincidence information may be transmitted from the HLR 105 to the switching center 104, and the clone detection alarm processing may be performed in the switching center 104.

According to this embodiment, the position registration information at the time of origination request is compared with the position registration information at the time of position registration request processing. A plurality of mobile terminals having the same telephone number are present can be detected. In the mobile communication system such as portable telephones, the presence of the illegally copied clone terminal 103 is detected, and the authentic user or subscriber is notified of the presence of the clone terminal.

On the network side (switching center 104 and HLR 105), the presence of a clone terminal is detected at the time of origination request of a mobile terminal by using the position registration information of existing mobile terminals. For this reason, the presence of the clone terminal 103 can be detected without causing the mobile terminal 102 to have any special function of detecting the presence of the clone terminal 103.

Second Embodiment

Figure 3:
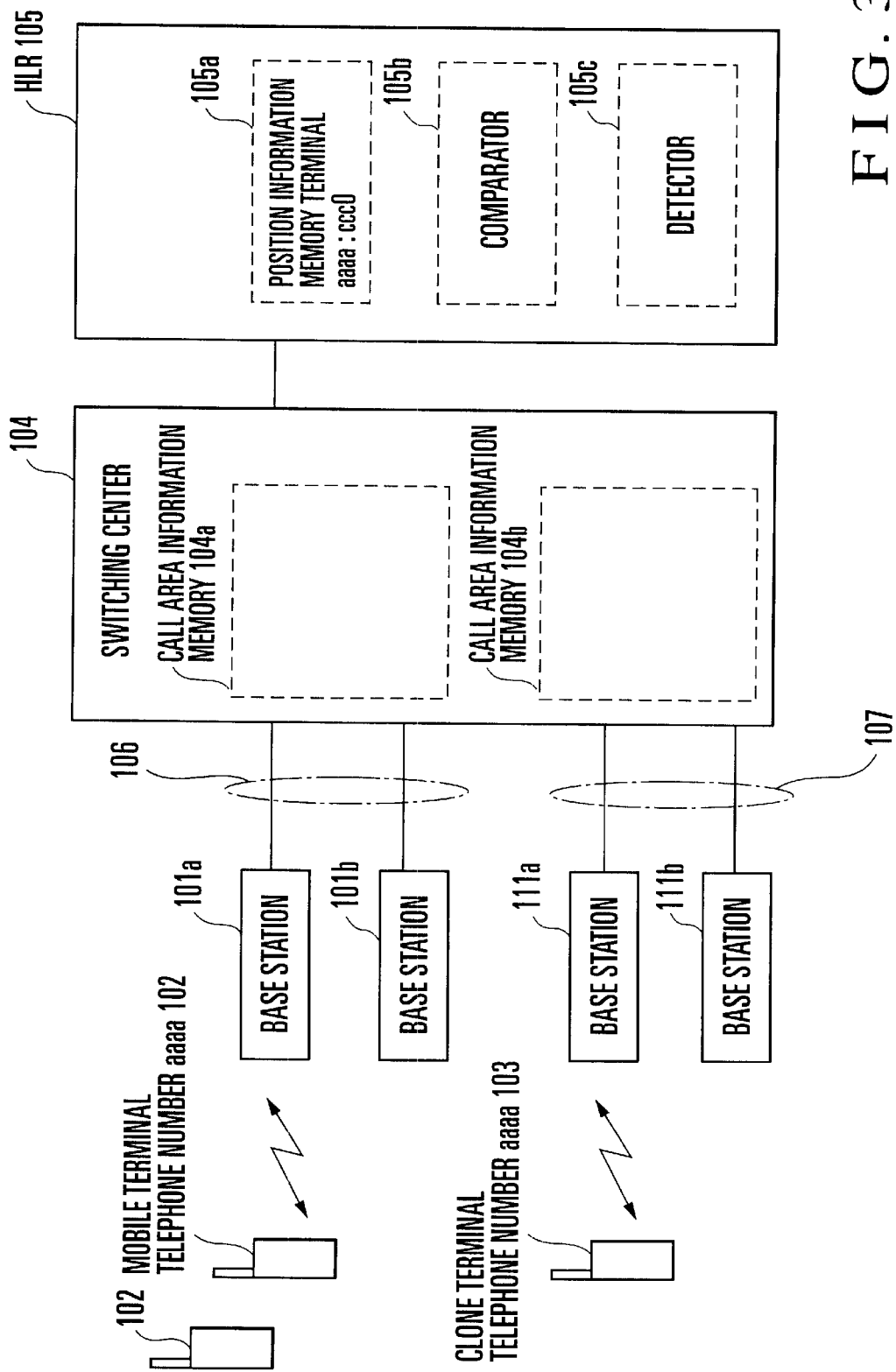
FIG. 3 is a block diagram showing the system configuration of a mobile communication system according to the second embodiment of the present invention.

FIG. 3 shows a mobile communication system according to the second embodiment of the present invention.

The mobile communication system shown in FIG. 3 includes a plurality of mobile terminals 102 including a mobile terminal having a telephone number "aaaa", a clone terminal 103 which is illegally copied from the mobile terminal 102 having the telephone number "aaaa" and has the same telephone number "aaaa", base stations 101a 101b, 111a, and 111b for communicating with the mobile terminal 102 and clone terminal 103, a switching center 104 connected to the base stations 101a, 101b, 111a, and 111b, and an HLR (Home Location Register) 105 connected to the switching center 104.

The base stations 101a and 111b located close to each other form a control group 106, while the base stations 111a and 111b located close to each other form a control group 107.

Figure 4A:
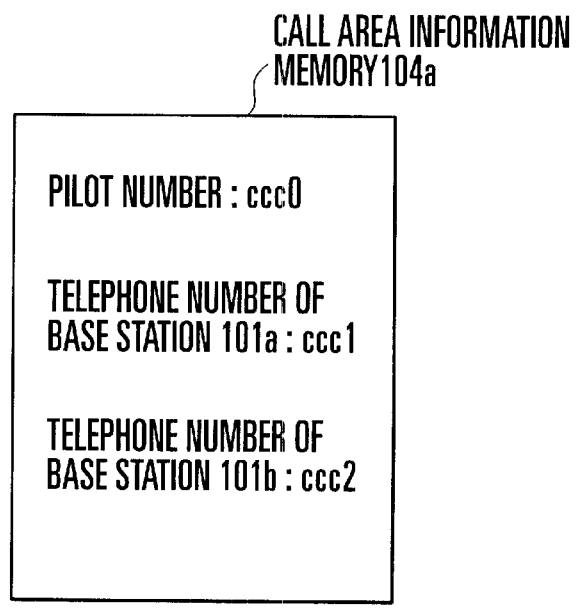
FIGS. 4A and 4B are views showing the contents of call area information memories corresponding to the respective control groups shown in FIG. 3.
Figure 4B:
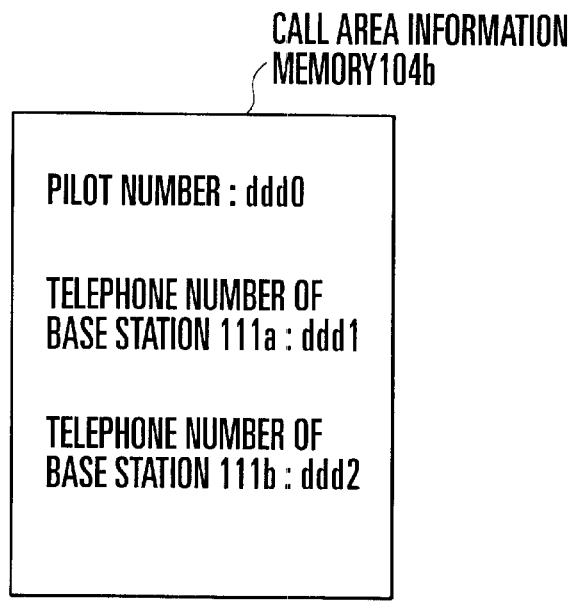
Figure 6A:
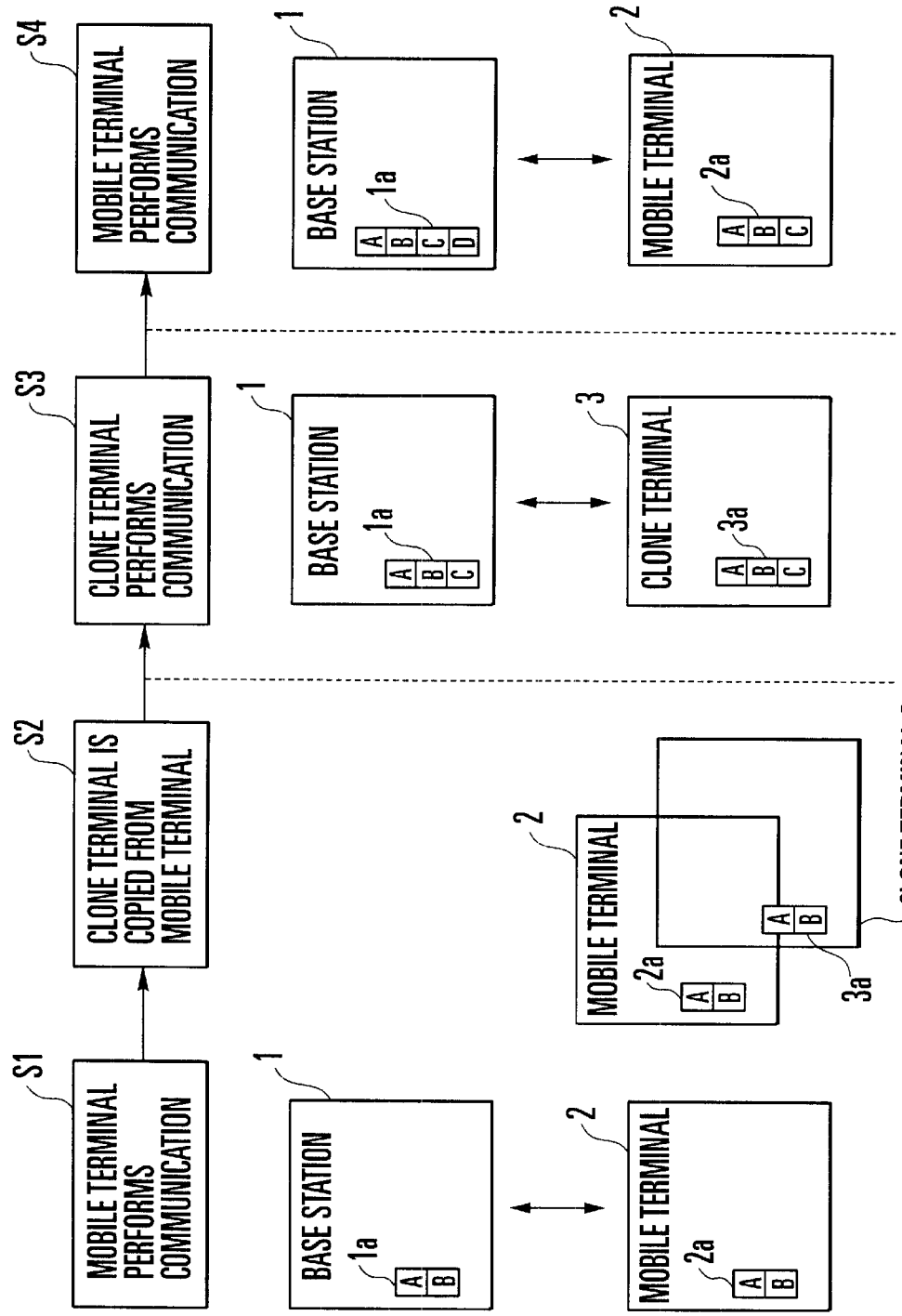
FIGS. 6A and 6B are sequence charts for explaining a conventional clone terminal detection operation.
Figure 6B:
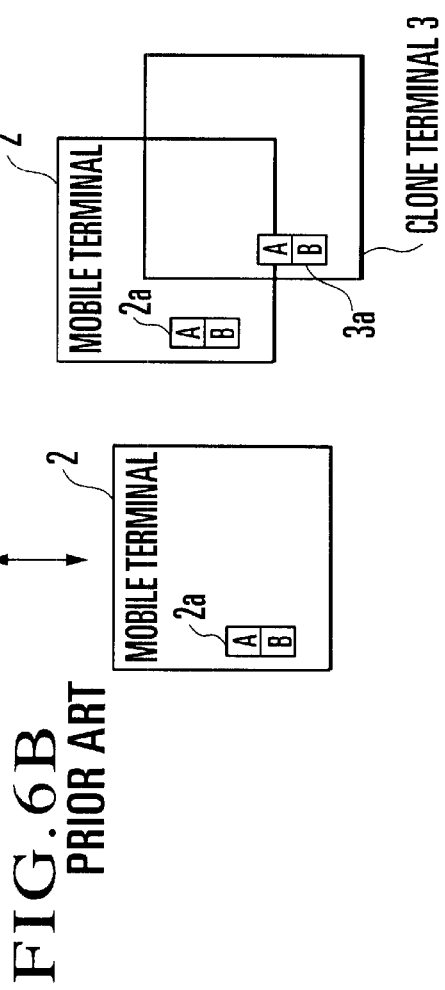

The switching center 104 comprises call area information memories 104a and 104b for, respectively, storing pieces of call area information for the control groups 106 and 107. The area information memory 104a stores, as call area information, telephone numbers "ccc1" and "ccc2" of the base stations 101a and 111b and a pilot number "ccc0" as a representative number of the telephone numbers of the base stations 101a and 101b, as shown in FIG. 4A. The area information memory 104b stores, as call area information, telephone numbers "ddd1" and "ddd2" of the base stations 111a and 111b and a pilot number "ddd0" as a representative number of the telephone numbers of the base stations 111a and 111b, as shown in FIG. 4B.

The HLR 105 comprises a position information memory 105a for storing the telephone number of the mobile terminal 102 and the pilot number of the control group 106 or 107 corresponding to the position-registered base station group of the mobile terminal 102, a comparator 105b for comparing the position registration information stored in the position information memory 105a with the received position registration information, and a detector 105c for detecting the presence of the clone terminal 103 on the basis of the comparison result from the comparator 105c.

The pilot number is used as the position registration information of the mobile terminal 102. The pilot number of the control group 106 or 107 is stored in the position registration memory of the HLR 105 as the position registration information when each mobile station registers the position.

The operation of the clone terminal detection system having the above arrangement will be described with reference to FIGS. 5A and 5B.

Position registration request processing of the mobile terminal 102 will be described first. As shown in FIG. 5A, when the mobile terminal 102 requests position registration with the telephone number "aaaa" for the base station 101a (step S31), the switching center 104 is notified of this position registration request (step S32). In response to this, the switching center 104 obtains the pilot number "ccc0" from the call area information memory 104a for the control group 106 and adds the telephone number "aaaa" and the pilot number "ccc0" to the position registration request, and sends the resultant position registration request to the HLR 105 (step S33). The HLR 105 stores in the position information memory 105a the pilot number "ccc0" as the position registration information of the mobile terminal having the telephone number "aaaa" (step S34).

Origination processing of the clone terminal 103 will be described with reference to FIG. 5B. When the clone terminal 103 sends the origination request with the telephone number "aaaa" for the base station 111a (step S35), the switching center 104 is notified of this origination request (step S36). The switching center 104 obtains the pilot number "ddd0" from the call area information memory 104b for the control group 106, adds the telephone number "aaaa" and the pilot number "ddd0" to the origination request, and sends the resultant request to the HLR 105 (step S37).

The comparator 105b of the HLR 105 compares the received pilot number "ddd0" with the pilot number "ccc0" stored in the position information memory 105a (step S38). As a result of comparison, when the received pilot number "ddd0" coincides with the stored pilot number "ccc0", normal origination processing is performed (step S39).

If the received pilot number "ddd0" does not coincide with the stored pilot number "ccc0", the detector 105c detects the presence of the clone terminal 103. The HLR 105 performs clone detection alarm processing, and the user of the mobile terminal 102 having the telephone number "aaaa" is notified of the presence of the clone terminal 103 (step S40).

The present invention is not limited to the particular embodiments described above. Various changes and modifications may be made within the spirit and scope of the invention. The number, position, and shape of constituent components described above are not limited to those described in the above embodiments. The number, position, and shape of components can be properly selected to practice the present invention. The same reference numerals throughout the accompanying drawings denote the same parts.

The foregoing arraignments of the present invention can provide the following effects.

As the first effect, in a mobile communication system such as portable telephones, an authentic user can be notified of an illegally copied clone terminal upon its detection. This is because the position registration information at the time origination request is compared with the position registration information at the time of position registration request processing, and a plurality of mobile terminals having the same telephone number can be detected.

As the second effect, the presence of a clone terminal can be detected without causing a mobile terminal to have a special function of detecting the presence of the clone terminal. This is because the clone terminal can be confirmed at the time of origination request of a mobile terminal by using the position registration function of the mobile terminal as a known function.

What is claimed is:

1. A clone terminal detection system comprising:

first storage means for updating and storing position registration information of a mobile terminal, which includes a telephone number, on the basis of a position registration request from one of said mobile terminal and a clone terminal illegally copied from said mobile terminal;

comparison means for comparing position registration information of an origination request terminal with the position registration information stored in said first storage means at the time of origination request from one of said mobile and clone terminals; and detection means for detecting the presence of said clone terminal having the same telephone number as that of said mobile terminal on the basis of a comparison result from said comparison means;

a switching center for switching between mobile communication channels, a plurality of base stations for exchanging information with said switching center and said mobile terminal via a radio interface;

a home location register having said storage means, said comparison means, and said detection means, wherein said home location register stores subscriber data of said mobile station, stores in said first storage means position registration information for specifying a correspondence between said mobile terminal and one of said plurality of base stations which controls said mobile terminal, by using the telephone number of said mobile terminal as a search key, and updates and stores the position registration information stored in said first storage means, in accordance with a position registration request received from said mobile terminal every time said mobile terminal moves;

a plurality of control groups each formed of base stations grouped in accordance with a location; and second storage means, arranged in said switching center, for storing telephone numbers of the base stations of the plurality of control groups and a representative pilot number of the control groups, wherein said switching center further adds the representative pilot number of the control groups to the position registration information of the origination request terminal from said base station and notifies said home location register of the position registration information with the representative pilot number.

2. A system according to claim 1, wherein the position registration information of said mobile terminal is stored in said first storage means by position registration processing of said mobile terminal for termination processing.

3. A system according to claim 1, wherein said base station notifies said home location register of the position registration information of the origination request terminal via said switching center at the time of origination request from one of said mobile and clone terminals.

4. A system according to claim 3, wherein said switching center adds identification information of said base station to the position registration information of the origination request terminal from said base station and notifies said home location register of the position registration information with the identification information.

5. A clone terminal detection method characterized by comprising the steps of:

updating and storing position registration information of a mobile terminal, which includes a telephone number, on the basis of a position registration request from one of said mobile terminal and a clone terminal illegally copied from said mobile terminal;

comparing position registration information of an origination request terminal with the stored position registration information at the time of origination request from one of said mobile and clone terminals; and detecting the presence of said clone terminal having the same telephone number as that of said mobile terminal on the basis of a comparison result from said comparison means;

providing a switching center for switching between mobile communication channels;

exchanging information between a plurality of base stations and said switching center and said mobile terminal via a radio interface;

storing subscriber data of said mobile station in a home location register, storing in said first storage means position registration information for specifying a correspondence between said mobile terminal and one of said plurality of base stations which controls said mobile terminal, by using the telephone number of said mobile terminal as a search key, and updating and storing the position registration information stored in said first storage means, in accordance with a position registration request received from said mobile terminal every time said mobile terminal moves, wherein the updating and storing step, the comparing step, and the detecting step are performed in said home location register; and dividing said base stations into a plurality of groups in accordance with locations;

storing telephone numbers of the base stations of the plurality of control groups and a representative pilot number of the control groups; and causing said switching center to add a representative pilot number of each control group to the position registration information of the origination request terminal from said base station and notify said home location register of the position registration information with the representative pilot number.

6. A method according to claim 5, wherein the updating and storing step comprises the step of storing the position registration information of said mobile terminal by position registration processing of said mobile terminal for termination processing.

7. A method according to claim 5, further comprising the step of causing said base station to notify said home location register of the position registration information of the origination request terminal via said switching center at the time of the origination request from one of said mobile and clone terminals.

8. A method according to claim 7, further comprising the step of causing said switching center to further add identification information of said base station to the position registration information of the origination request terminal from said base station and notify said home location register of the position registration information with the identification information.

9. A clone terminal detection system comprising:

first storage means for storing position registration information of a mobile terminal, said first storage means located in a home location register;

comparison means for comparing the position registration information stored in said first storage means with position registration information from one of said mobile terminal and a clone terminal making a position registration request, said comparison means located in the home location register;

detection means for detecting the presence of said clone terminal based on a comparison result from said comparison means, said detection means located in the home location register;

a switching center for switching between mobile communication channels;

a plurality of base stations for exchanging information with said switching center and said mobile terminal;

a plurality of control groups each formed from a subset of said plurality of base stations; and second storage means for storing pilot numbers identifying each of said plurality of control groups, said second storage means located in said switching center, wherein said position registration information specifies a correspondence between said mobile terminal and one of said plurality of base stations, wherein said home location register updates the position registration information stored in said first storage means in accordance with a position registration request received from said mobile terminal every time said mobile terminal moves, and wherein said switching center notifies said home location register of the pilot number of one of said plurality of control groups and the position registration information of the mobile terminal or clone terminal making a position registration request.

10. A clone terminal detection method comprising the steps of:

storing position registration information of a mobile terminal in a first storage means;

comparing, using a comparison means, the position registration information with position registration information from one of said mobile terminal and a clone terminal making a position registration request;

detecting the presence of said clone terminal based on a comparison result from the comparison means;

switching between mobile communication channels at a switching center;

exchanging information at a plurality of base stations with said switching center and said mobile terminal;

forming a plurality of control groups from a subset of said plurality of base stations; and storing pilot numbers in a second storage means for identifying each of said plurality of control groups, said second storage means located in said switching center, wherein said position registration information specifies a correspondence between said mobile terminal and one of said plurality of base stations, wherein a home location register updates the position registration information stored in said first storage means in accordance with a position registration request received from said mobile terminal every time said mobile terminal moves, and wherein said switching center notifies said home location register of the pilot number of one of said plurality of control groups and the position registration information of the mobile terminal or clone terminal making a position registration request.

* * * * *